United States Patent [19]

Matsuzaki et al.

[11] 4,392,815
[45] Jul. 12, 1983

[54] BURNER FOR BOTTOM FIRED FURNACE

[75] Inventors: Minoru Matsuzaki; Toshiei Kawauchi, both of Chiba; Tsugio Murakami, Ichihara; Hideo Kishira, Chiba, all of Japan

[73] Assignee: Kawasaki Steel Corporation, Kobe, Japan

[21] Appl. No.: 234,911

[22] Filed: Feb. 17, 1981

[30] Foreign Application Priority Data

Jul. 17, 1980 [JP] Japan ................................. 55-97938

[51] Int. Cl.³ .............................................. F23C 5/08
[52] U.S. Cl. ..................................... 431/175; 431/181; 432/120
[58] Field of Search ............... 431/159, 174, 175, 181, 431/187; 432/120, 193, 194

[56] References Cited

U.S. PATENT DOCUMENTS

| 2,847,063 | 8/1958 | Reed et al. | 431/175 |
| 3,411,761 | 11/1968 | Gmell | 431/173 X |
| 4,174,201 | 11/1979 | Straitz | 431/174 X |

Primary Examiner—Edward G. Favors
Attorney, Agent, or Firm—Fidelman, Wolffe & Waldron

[57] ABSTRACT

A burner for a bottom fired, ingot heating furnace producing faster and more even heating with lower fuel consumption is disclosed. The burner includes a plurality, preferably three, upstanding nozzles having nozzle ports directed at essentially a right angle to a radial line extending from the burner center. This orientation imparts a circular swirling action of the combustion gases which produces faster and more even heating of ingots contained within the furnace. The nozzle is arranged with a nozzle cap which shields the entire nozzle top from debris falling from the furnace roof resulting in a greatly extended service life.

6 Claims, 10 Drawing Figures

BURNER FOR BOTTOM FIRED FURNACE

The present invention relates to a burner for use in a bottom fire type holding furnace, and more particularly to a burner for use in a bottom fire type holding furnace, in which the combustion can be attained under a short flame condition by using a blast furnace gas, a coke oven gas or the like as a fuel.

A holding furnace is an apparatus which is usually intended to uniformly heat steel ingots or slabs to a predetermined temperature and can be classified into various types in accordance with the flow of the combustion gas. In a bottom fire type of these, the fuel is burned while ascending vertically from the port at the center of the furnace bottom, and the steel ingots or the like are stood around the port. The burned gases ascend through the combustion zone and then descend between the steel ingots or the like and along the vicinity of the furnace wall, while being partially entrained by the inner ascending gas flow at a high temperature, so that an excellent circulation can be attained. The holding furnace thus constructed is featured over other types in that it can be made shallower but has an intrinsic drawback that it is susceptible to damages because its burner port is formed in the furnace bottom.

Incidentally, in case a gas is to be used as the fuel, the mixed gas such as the blast furnace, coke oven or converter gas, which is by-produced in a continuous plant of making pig iron and steel, is used.

In the burner which is commonly used as present in such bottom fire type holding furnace, as shown in FIG. 1A, four straight pipe type gas nozzles 2 (which should be referred to FIG. 1B) are mounted on the upper end of a gas header 1 and are surrounded by a circumferential port 3, thus constructing an air inlet space 4 for fuel between the gas nozzles 2 and the circumferential port 3.

In the burner thus constructed, the fuel gas such as the blast furnace gas is injected from the gas nozzles 2 by the static pressure which is maintained in the gas header 1. As a result, the fuel gas is brought at its outer circumference into contact with the air flow coming from the air inlet space 4 so that it is burned while continuing its diffusing process. Thus, since the diffusion between the fuel gas and the air flow is slow, the combustion is sustained by a long flame so that the space for the flame is expanded.

The schematic outline, in which the burner shown in FIGS. 1A and 1B is used in the holding furnace, as shown in FIG. 2.

Since, in the case of said burner, it takes a long time to effect the diffusion between the fuel gas and the air flow, the combustion is not completed in combustion chamber 5 but is sustained by the unburned gas even in preheat chambers (or recuperator chambers) 6 at the both sides.

As a result, the supply of the fuel is so restricted as to make it difficult to expect the uniform heating promptly to a predetermined temperature.

On the other hand, since said burner belongs to the long flame pattern, as has been described in the above, the temperature distribution in the holding furnace has a tendency that the temperature in the vicinity of a furnace crown 5' is the highest. As a result, the heat transfer is the higher to an upper portion 7' of a steel ingot 7 to be heated and is the lower to a lower portion 7" of the same so that the temperature difference becomes undesirably large between the upper and lower portions 7' and 7" of the steel ingot 7.

The measured results of the temperature distribution in the furnace of the burner according to the prior art are plotted in FIG. 3. This is the temperature distribution in the furnace when the combustion is effected at an excess air ratio of 10%, and symbols correspond to the following temperature distributions, respectively:

○: Temperature Distribution on Center Axis
●: Temperature Distribution on Vertical Axis 300 mm Apart from Center Axis
△: Temperature Distribution on Vertical Axis 600 mm Apart from Center Axis.

As has been described in the above, since the temperature rise in the vicinity of the furnace bed is delayed more than that at an upper portion of the furnace, it takes a long time to make the article to be heated reach a uniform temperature thereby to make it difficult to reduce consumption of the fuel used. If the fuel consumption is to be excessively reduced, the uniform plastic deformation cannot be attained during the subsequent rolling step due to the irregularity in the temperature distribution in the article to be heated, thus inviting loss in the yield.

In view of the recent deterioration in energy circumstances, therefore, a variety of proposals in the aspect of the flame pattern have been made with a view to reducing the consumption rate of the fuel used in the holding furnace.

It is, however, the current practice that a satisfactory combustion burner determining the combustion efficiency or the holding property of the article cannot be provided in the bottom fire type holding furnace. As a result, it is remarkably difficult to accomplish the reduction of the fuel consumption rate while maintaining the quality of slabs.

The proposal of the aforementioned flame pattern is disclosed in Japanese Pat. No. 877167 (corresponding to Japanese Patent Publication No. 52-4245), for example.

The disclosure is characterized in that the leading end portion of a burner nozzle which is formed at its center with an air injection port and concentrically around the air injection port with at least two fuel gas injection ports is formed into a conical shape so that the annular air injection ports are formed around the leading end portion of the burner nozzle, whereby the contacting area between the fuel gas and the air flow is enlarged to promote the diffusion inbetween.

Thus, a short flame resembling an ideal combustion flame can be produced. However, since the gas injection port and the air injection ports are all directed upward, they are frequently clogged with or broken by the falling substance coming from above the burner port to such an extent that the burner cannot be operated. Moreover, since the ignition point is in the vicinity of the leading end of the burner nozzle and since the construction is complex, the maintenance of the initial shape is made difficult by a low thermal stress, and the burner can enjoy only about three month life at the longest when it is used in an actual furnace. At the same time, although the temperature difference in the longitudinal direction of the steel ingot is considerably improved, a desired mixing cannot be instantly expected from the start point for the diffusion between the fuel gas and the air flow vertically ascending in parallel so that the temperature at the lower portion of the steel ingot is still lower than that at the upper portion. Therefore, the burner thus disclosed is not suitable for the burner as the following means.

More specifically, the improvement in the flame pattern has been described in the above as a method of reducing the fuel consumption rate in the holding furnace. As another method, the so-called "track time" after the molten steel is poured into a mold before the holding furnace is loaded with the molded hot ingot is so shortened that the potential heat of the hot ingot may be effectively utilized. However, the temperature distribution of the hot ingot in the vertical direction at the time when the holding furnace is charged with the hot ingot exhibits the minimum at the lower portion of the steel ingot. This is caused by the fact that the hot ingot is deprived of its heat by the recessed bottom plate on a truck while being transported. In order that the hot ingot having such temperature distribution may be uniformly heated within a short time period, it is necessary to raise the temperature in the vicinity of the bed of the holding furnace thereby to accelerate the temperature rise at the lower portion of the steel ingot. The disclosure of the aforementioned Japanese Pat. No. 877167 is insufficient for attaining the purpose by the aforementioned reasoning.

The present invention has been conceived in view of the background and contemplates to provide a burner for use in a bottom fire type holding furnace, which can be semipermanently used to establish an ideal combustion flame while overcoming the aforementioned drawback concomitant with the prior art.

The feature of the present invention resides in that the fuel gas is helically injected so that it may be swirled whereby its diffusion and mixing with the air flow is made to reach a desired level even at the start point so that the flame can be sufficiently stabilized in the burner port thereby to ensure the prompt combustion.

Other objects and advantages of the present invention will become apparent from the following description taken in conjunction with the accompanying drawings, in which.

Figure 4A:
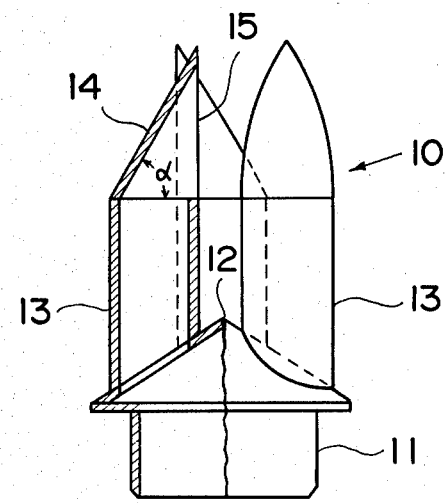
FIGS. 4A and 4B are a front elevation and a top plan view showing a burner according to an embodiment of the present invention.
Figure 4B:
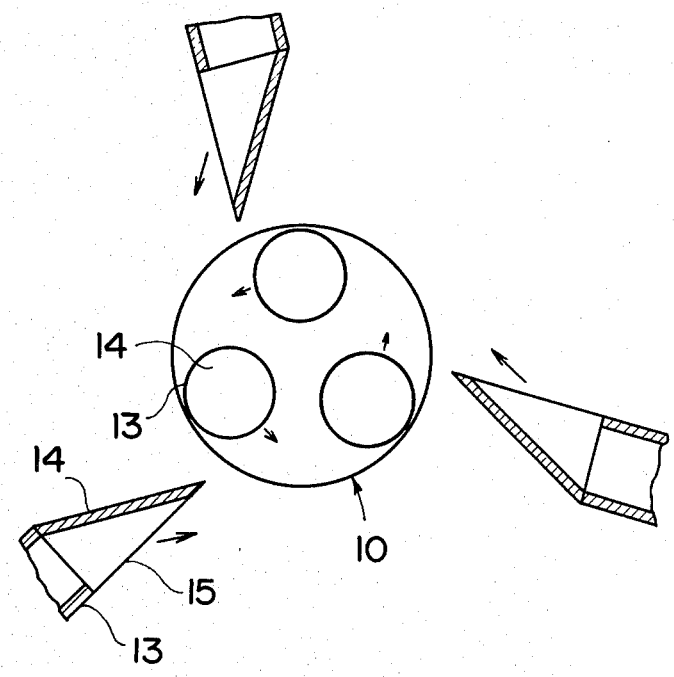

Referring now more particularly to the drawings in detail, in a gas burner 10 according to the present invention, as shown in FIGS. 4A and 4B, there is constructed at the upper portion of a gas header 11 a conical cap 12, in which a plurality of gas nozzles 13 are arranged in upright positions.

Said gas nozzles 13 are usually three in number and are arranged equi-angularly about the gas burner 10, as is apparent from FIGS. 4A and 4B. The upper ends of the gas nozzles 13 are covered with respective head covers 14 which are inclined at a suitable angle with respect to the directions which are perpendicular to the radial extensions from the burner center. Each of the nozzles 13 has its side wall formed with an oval nozzle port 15 which extends from the upper end of the corresponding head cover 14.

In other words, each of the gas nozzles 13 is composed of a cylindrical lower portion and an upper portion having a semi-transverse section.

The gas nozzles 13 may be basically sufficient, if they allow a gas to flow therethrough, so that they can have a triangular, square or polygonal shape. However, since the gas nozzles are usually made of a refractory alloy (e.g., 26Cr steel in actual use), they may preferably be cylindrical from the standpoint of their machinability, weldability, deformation resisting property or the like.

Thus, the open directions of the nozzle ports 15 under consideration are at a right angle with respect to the radial extensions from the burner center (as shown in arrows in FIG. 4B). On the other hand, the angle $\alpha$ of injection of the gas nozzles 13 (which can be referred to FIG. 4A) can be changed by means of their respective head covers 14. Generally speaking, the bottom fire type holding furnace is made relatively shallow. It is therefore necessary to prevent the flame from impinging upon the furnace wall to flow along the furnace wall thereby to overheat the head portion of the steel ingot.

The lengthes of the flame are measured for the changed values of the inclination angle $\alpha$ and are tabulated in the following Table 1:

TABLE 1

| $\alpha$ | Length of Flame | Charge of Mgas 1360 Kcal/Nm$^3$ |
| --- | --- | --- |
| 90° | 7 to 8 m | 3500 Nm$^3$/hr |
| 60° | 3 to 4 m | " |
| 45° | 2 m | " |

The holding furnace is usually loaded with a steel ingot such that the mass is larger at its lower portion. Therefore, improvement in the burn at the lower portion is effective, because of the shortened stay time, to prevent the increases in the fuel consumption rate and in the scale loss and the unsymmetrical shape of slab at rolling. It is therefore necessary to have a proper flame length.

According to the experimental results for the furnace actually used, the inclination angle $\alpha$ is preferable to have a value of 60 degrees but may be smaller than that value.

If the angle $\alpha$ is made smaller than 45 degrees, an adverse effect that the burner itself and the service door at the lower portion of the burner are overheated results.

It is therefore recommended that the injection angle of the gas nozzles is determined at a suitable value in accordance with the depth of the furnace and the height of the steel ingots to be handled.

As a result, the gas flow injected from the aforementioned nozzle ports 15 establishes swirls in the burner port so that it is intensely mixed with the air flow from the start point of injection. Thus, the air and the gas are excellently diffused to ensure the short flame combustion having a shortened diffusion time.

Figure 1A:
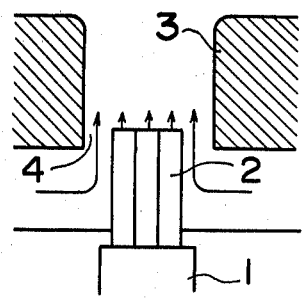
FIGS. 1A and 1B are a front elevation and a top plan view showing a burner according to the prior art.
Figure 1B:
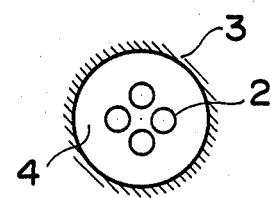
Figure 2:
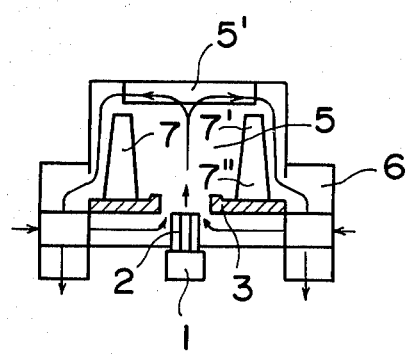
FIG. 2 is a sectional view showing a holding furnace into which the burner of FIGS. 1A and 1B is incorporated.
Figure 3:
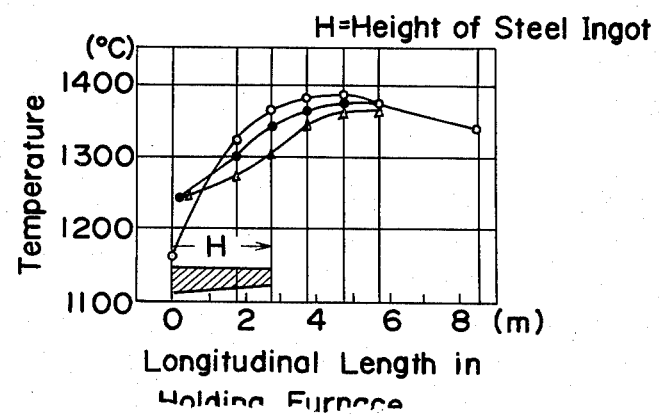
FIG. 3 is a graph plotted with the temperature distribution in the holding furnace in case the conventional burner is used.
Figure 5:
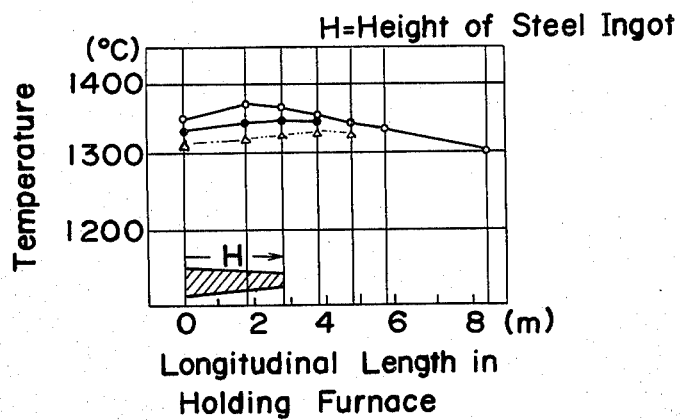
FIG. 5 is a graph plotted with the temperature distribution in the holding furnace in case the burner according to the present invention is used.

More specifically, FIG. 5 is a graph illustrating the temperature distribution in the furnace when the combustion was effected at an air excess ratio of 10% by the use of the burner according to the present invention to be compared with the conventional burner shown in FIG. 3. As is more apparent from the comparison, the uniform heating treatment of the steel ingots could be attained, and the temperature at the furnace bed was as high as that at the upper portion.

The high furnace bed temperature could not be realized by the aforementioned Japanese Pat. No. 877167.

Incidentally, the flame of FIG. 3 was measured to have a length of 7 to 8 m from the burner port and a diameter of 0.9 to 1.0 m. On the contrary, the flame obtained in the burner of FIGS. 4A and 4B according to the present invention had a length of 3 to 4 m and a diameter of 0.6 m.

Figure 6:
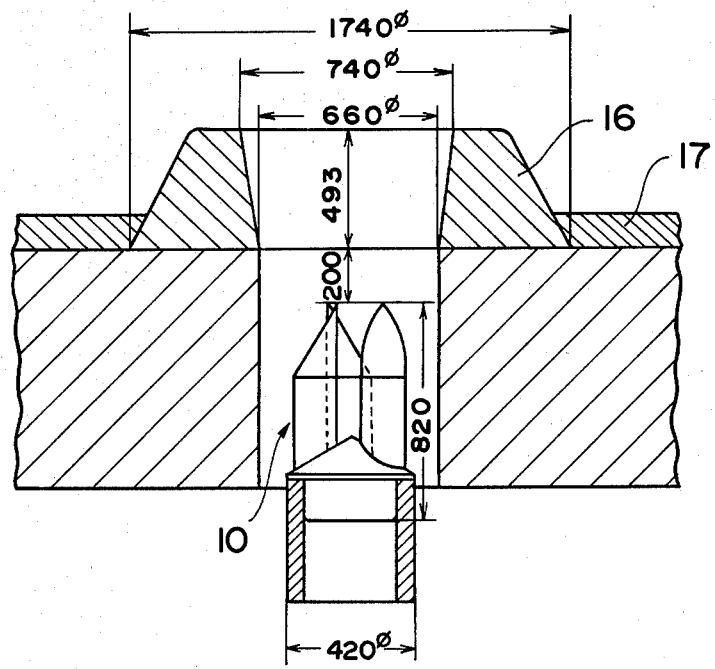
FIG. 6 is a diagram showing the arrangement of the burner according to the present invention and the burner port of the holding furnace.

Incidentally, the burner port of the burner of the present invention was practised in such sizes as are shown in FIG. 6, in which reference numerals 16 and 17 indicate a burner port and a furnace bed, respectively.

As has been described hereinbefore, according to the present invention, the temperature difference in the longitudinal direction of the steel ingot is eliminated to increase the holding property so that the burn especially at the bottom portion of the steel ingot can be made excellent. As a result, the unsymmetrical shape of slab at rolling which is majorly caused by the irregular temperature distribution in the steel ingot can be reduced and the yield increases.

On the other hand, the burner according to the present invention has such a simple construction that it can be repaired without any difficulty. More specifically, since the nozzle ports 15 are formed in the side walls of the nozzles 13, they are neither clogged with nor broken by the falling articles from above the burner port thereby to make it little probable that the burner cannot be used. Incidentally, the actual measurements have found that the burner according to the present invention maintains its initial shape even after five years have elapsed.

According to the present invention, moreover, since a stable short flame pattern is formed, the space required for the combustion can be reduced to attain the complete combustion and the reduction in the fuel supply thereby to reduce the material consumption and to make a run possible for a low oxygen ratio. This results in an advantage that the yield is improved to decrease the scale loss.

The more detailed comparison with the prior art method will be made in the following.

Figure 7:
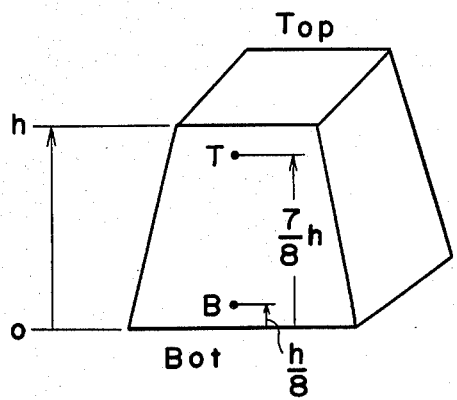
FIG. 7 is an explanatory view illustrating the temperature measuring positions of a steel ingot.

Specifically, the holding furnace was loaded with 23 tons of (a single ingot) of rimmed steel and 7.2 tons of (nine ingots) of cold stainless steel together as the steel ingots to be subjected to the temperature measurements. The preset temperature was 1250° C. The temperature measuring positions of the steel ingots are shown in FIG. 7. The temperature measuring experiments were performed by the use of both the burners according to the prior art and the present invention. The results of the respective temperature measurements are illustrated in FIG. 8.

In FIG. 7, refernece letters T and B indicate the temperature measuring of the top portion and the bottom portion, respectively.

Figure 8:
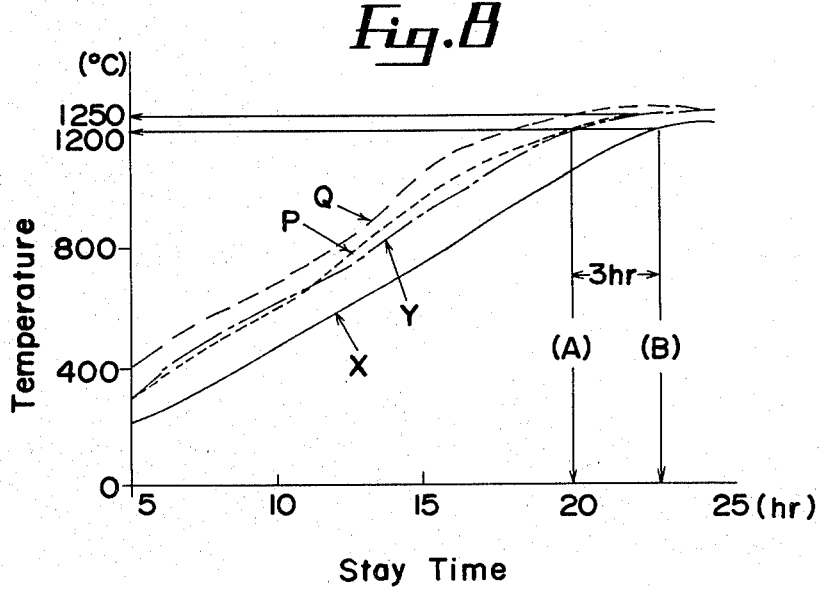
FIG. 8 is a graph illustrating the measured results of the temperature.

The reference letters in FIG. 8 are as follows:
(A) Burner of Present Invention
   P=Bottom Portion
   Q=Top Portion
(B) Burner of Prior Art
   X=Bottom Portion
   Y=Top Portion The burner according to the prior art requires a long time for the diffusion between the fuel and the air so that the combustion is not completed in the combustion chamber but continued of the unburned content in the preheat chambers with the resultant high loss in the energy to be consumed. Moreover, since it is necessary to increase the air supply for completing the unburned content, it is difficult to make a run at an ideally low oxygen ratio.

When the burner according to the present invention, on the contrary, the gas is so sufficiently diffused with the air flow within a short time period that it can be completely burned in the combustion chamber. As a result, the air supply can be reduced for the fuel charge.

The fuel consumption ratio to a unit material, the oxygen concentration in the waste gas and the burn loss ratio when the burners according to the prior art and the present invention were used are tabulated for comparison in the following Table 2:

TABLE 2

|  | Fuel Consumption Ratio | O$_2$ Concentration | Scale Loss |
| --- | --- | --- | --- |
| Burner of Prior Art | 480 × 10$^3$ Kcal/T | 3.0 to 4.0% | 0.7% |
| Burner of Invention | 430 × 10$^3$ Kcal/T | 1.0 to 1.5% | 0.4% |

If the burn of the steel ingots is determined at a point when the bottom portion thereof reaches a preset temperature (e.g., 1250° C.), there is found a difference of about three hours between the burner (B) according to the prior art and the burner (A) according to the present invention in view of FIG. 8 so that the holding efficiency can be improved by the use of the burner of the present invention. This is because the flame to be established by the burner of the present invention is so shortened as to eliminate a high difference in the temperature distribution in the holding chamber and to improve especially the burn of the bottom portion better than that when the conventional burner is used.

The unsymmetrical shape of slab, which might otherwise be caused by the irregularity in the temperature distribution of the steel ingot being rolled, are reduced by that improved burn of the bottom portion, i.e., by the uniformity in the temperature distribution of the steel ingot. The percentage of the unsymmetrical shape of slab in case the conventional burner is used is 20 to 40% whereas that percentage in case the burner of the present invention is used is 10 to 25% while improving the yield to about 0.2%.

What is claimed is:
1. A burner for a bottom fired, ingot heating furnace having a burner port through the bottom of said furnace, and comprising:
   a gas header centrally disposed relative to a central axis of said burner port such that air is supplied to said burner port around said header;
   plural gas nozzles arranged atop of and in communication with said header and equi-angularly arranged about said burner port central axis, each of said nozzles comprising a generally vertical conduit portion terminating in a head cover portion having a nozzle port such that gas is supplied to said burner port from said nozzle port along a direction generally defineable by a gas supply axis intersecting a plane perpendicular to said central axis at an angle, said gas supply axis being generally tangential to a circle contained within said plane and having a radius extending from said central axis to an apex of said angle; and said head cover portion comprising a shield for the top of said conduit portion and said nozzle port, such that articles falling from said furnace are prevented from clogging said nozzle port;

whereby said gas is caused to flow helically and diffuse and mix with said air to provide a short flame.

2. A burner as in claim 1, wherein said angle is in a range of about 45 degrees to about 60 degrees.

3. A burner as in claim 1, wherein said angle is in a range of less than 60 degrees to about 45 degrees.

4. The burner of claim 1 wherein said angle is about 60 degrees.

5. The burner of claim 1 wherein said gas nozzles are three in number.

6. The burner of claim 1 wherein said nozzles are constructed from a refractory alloy.

* * * * *